Oct. 11, 1932.     E. E. SLICK     1,882,198
LIFTING LUG AND POURING SPOUT
Filed Jan. 25, 1930
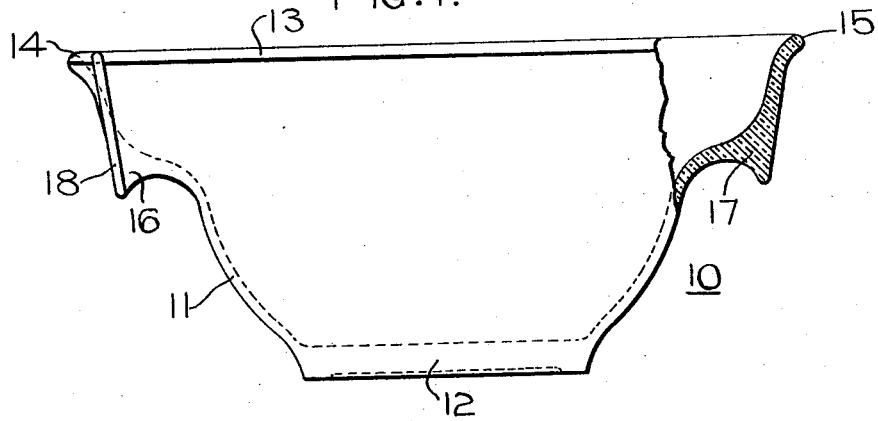
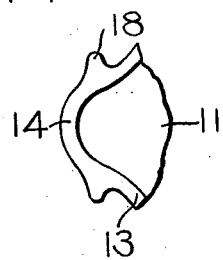 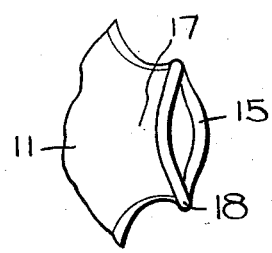
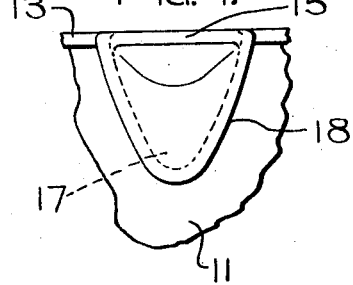
INVENTOR
Edwin E. Slick
by his attorneys
Byrnes, Stebbins, Parmelee & Blenko Patented Oct. 11, 1932

1,882,198

UNITED STATES PATENT OFFICE

EDWIN E. SLICK, OF PITTSBURGH, PENNSYLVANIA

LIFTING LUG AND POURING SPOUT

Application filed January 25, 1930. Serial No. 423,344.

My invention relates to a combined lifting means and pouring spout for a liquid-containing vessel. In the following description, it will be explained as applied to a cooking utensil, such as a mixing bowl, although it has other applications.

As mixing bowls are made at present, they are either without handles or pouring spouts, or may be provided with one or two spouts. Since these bowls lack any gripping means, it is sometimes difficult to retain a firm grip on the smooth surfaces on the inside and outside of the bowl. In order to eliminate this objection, I provide a receptacle, such as a mixing bowl, with pouring lips and lifting lugs. In accordance with the invention, the rim of the bowl is provided with outwardly curving pouring lips forming spouts. Integral with the spouts, I form a depending lifting lug, by which the bowl may be seized and lifted with ease. In order to prevent the lifting lug from slipping from the holder's fingers, I provide the latter with an external rim or bead.

A present preferred embodiment of the invention is illustrated in the accompanying drawing, in which Figure 1 is a side elevation, partly in section, of a mixing bowl having the invention applied thereto;

Figure 2 is a partial top plan view, showing one of the pouring spouts, as well as the bead surrounding the lifting lug;

Figure 3 is a partial bottom plan view of the lifting lug and pouring spout; and Figure 4 is a partial end elevation thereof.

Referring to the drawing, the mixing bowl 10 comprises a body portion 11, a base 12, and a rim 13. The bowl may be of any suitable material and in one form is made of glass. At diametrically opposite points, the rim 13 is outwardly curved as at 14 and 15 to form pouring spouts. Lifting lugs 16 and 17 are formed integral with said spouts to afford a convenient means for seizing and gripping the bowl adjacent its rim. The lifting lugs and pouring spouts are formed into a single lateral projection from the rim of the bowl. The projection has a flat surface, which is inclined slightly to the vertical. A curved edge or bead 18 is provided on the lugs 16 and 17 in order to prevent the lug from slipping from the holder's hand.

The lifting lugs 16 and 17 may be seized in any one of a number of ways and provide means for securely holding the bowl in any desired position. Pouring the contents of the bowl out of one spout is very easy when the bowl is held by the other spout and lug. The bowl may be held in one hand or two and the lugs are well adapted for seizure from above or below. In either case, the bead 18 affords the holder a secure grip on the bowl. Important advantages of the structure shown are the ease of manipulation and the security of the grip on the bowl which are afforded by the combined lifting lugs and pouring spouts.

Although I have illustrated and described but a single modification of the invention, I do not intend to be limited to the specific details thereof, since the invention may be practiced in other forms than that shown, within the scope of the following claims and without departing from the spirit of the invention.

I claim:

1. In a vessel, the combination with two lifting lugs adjacent the rim of the bowl and diametrically opposite each other, of a pouring spout integral with each of said lugs.

2. A lifting lug for a vessel, formed integral with a pouring spout in the rim thereof, including a substantially flat face the plane of which makes a slight angle with the vertical, and a bead around the edge of said face.

3. In a bowl, pouring lips at opposite sides thereof, lifting lugs below said lips having a peripheral bead forming ears thereon.

In testimony whereof I have hereunto set my hand.

EDWIN E. SLICK.